US005342248A

United States Patent [19]

[11] Patent Number: 5,342,248
[45] Date of Patent: Aug. 30, 1994

Matsubara et al.

[54] AUXILIARY EQUIPMENT DRIVE SYSTEM

[75] Inventors: Taiji Matsubara, Higashihiroshima; Naoyuki Yamagata, Hiroshima, both of Japan

[73] Assignee: Mazda Motor Corporation, Hiroshima, Japan

[21] Appl. No.: 109,484

[22] Filed: Aug. 20, 1993

[30] Foreign Application Priority Data

Aug. 20, 1992 [JP] Japan .................................. 4-245918

[51] Int. Cl.[5] .................................. F16H 59/00
[52] U.S. Cl. .................................. 474/69; 474/18
[58] Field of Search .................. 474/11, 12, 17, 18, 474/69–73; 192/48.8, 48.9; 74/340, 356

[56] References Cited

U.S. PATENT DOCUMENTS

| | | | |
|---|---|---|---|
| 4,630,504 | 12/1986 | Smirl | 474/72 X |
| 4,740,191 | 4/1988 | Takano et al. | 474/69 |
| 4,895,552 | 1/1990 | Abo et al. | 474/18 X |
| 4,913,686 | 4/1990 | Hattori | 474/18 X |
| 5,176,579 | 1/1993 | Ohsono et al. | 474/18 X |

FOREIGN PATENT DOCUMENTS

| | | |
|---|---|---|
| 61-93232 | 5/1986 | Japan . |
| 61-105342 | 5/1986 | Japan . |
| 63-21736 | 1/1988 | Japan . |

*Primary Examiner*—Thuy M. Bui
*Attorney, Agent, or Firm*—Keck, Mahin & Cate

[57] ABSTRACT

A drive system for driving an engine auxiliary equipment has a first power transfer device for transferring an output torque of the crankshaft to an interim shaft at all time and a second power transfer device comprising a crank pulley mounted for relative rotation on the crankshaft, an interim pulley mounted for relative rotation on the interim shaft and an input pulley related to the auxiliary equipment all of which pulleys are operationally coupled by a belt so as to transfer an output torque of the crankshaft to the auxiliary equipment. A first clutch is disposed between the crankshaft and crank pulley so as to connect and disconnect a transfer of power between the crankshaft and crank pulley. A second clutch is disposed between the interim shaft and interim pulley so as to connect and disconnect a transfer of power between the interim shaft and interim pulley. The first and second clutches are actuated to create a first transfer path or a second transfer path which are different in ratio of power transfer.

10 Claims, 6 Drawing Sheets

AUXILIARY EQUIPMENT DRIVE SYSTEM

BACKGROUND OF THE INVENTION

1. Field of the Invention

This invention relates to a system for driving auxiliary equipments by an automobile engine, and, in particular, to an auxiliary equipment drive system for driving the auxiliary equipments by an engine crankshaft through a power transmission mechanism.

2. Description of Related Art

Automobile engines are equipped with various auxiliary devices or equipments, such as alternators, air conditioner compressors, oil pumps, and water pumps, etc., which are driven by means of belts and pulleys connected to an engine crankshaft. For example, Japanese Unexamined Patent Publication No. 61-93232 discloses a configuration for driving a mechanical super charger, which is one of the auxiliary equipments, by an output shaft of a stepless transmission which can transfers the rotation of the engine crankshaft at linearly varying speeds. Similarly, Japanese Unexamined Utility Model Publication No. 63-21736 discloses a configuration for driving a supercharger by a crankshaft through a belt and pulley mechanism. In this mechanism, the supercharger is provided on its input shaft with an input pulley and a disk pressed against the input pulley via a facing member by means of an urging mechanism. This urging mechanism allows the disk to slip relatively the pulley so as to absorb the input torque from the crankshaft to the supercharger when the supercharger is disabled to operate.

On the other hand, Japanese Unexamined Patent Publication No. 61-105342 discloses a compressor drive mechanism for driving a compressor, which is one of engine related auxiliary equipment, in two different way. This compressor drive mechanism includes a plurality of pulleys provided on a crankshaft, first and secondary pulleys which are coaxially attached to a drive shaft of compressor, and first and secondary idle pulleys provided between the first and secondary compressor pulleys and between the first and secondary crankshaft pulleys, and first and secondary electromagnetic clutches disposed between the first and secondary compressor pulleys and between the first and secondary idle pulleys, respectively, for engaging and disengaging the compressor pulleys and the idle pulleys. By locking or unlocking of the first and secondary electromagnetic clutches, the transmission path from the crankshaft pulley to the first and secondary compressor pulleys is changed in two different courses.

Some of engine related auxiliary equipment, such as a mechanical supercharger, is provided with helical gears, as a torque input shaft, which are in mesh with each other and are mounted on a pair of parallel drive shafts, In this instance, as the supercharger operates, each of the drive shafts sustains a thrust force and consequently, cause axial vibration or oscillation. Especially, in the case where the supercharger is provided with a body of relatively large mass, such as a clutch by which supercharger pulleys, mounted for relative rotation on the drive shaft and driven by the crankshaft, are mechanically connected and disconnected, vibration of the supercharger is increased with an accompanying increase in noise.

In the case where a clutch is provided to an auxiliary equipment usually mounted on an engine by means of brackets, such as a supercharger, an alternator and the like and as a result, there is caused an increase in the weight of the auxiliary equipment, shifting of the center of gravity of the engine or the overall distribution of weight on the engine is caused, so that the added equipment becomes yet another source of engine vibrations.

SUMMARY OF THE INVENTION

It is a first object of the present invention to provide a drive system for driving auxiliary equipments by an engine crankshaft which can hold down an undesired increase in the weight of the auxiliary equipments and, thereby, reduce vibrations of the auxiliary equipments and their related noise.

It is another object of the present invention to provide a driving system which can avoid problems associated with an imbalance in the distribution of weight on the engine or a shift of the center of gravity.

With the auxiliary equipment drive system of this invention, the auxiliary equipment is driven through a power transfer mechanism which transfers the rotational force of the crankshaft. The system has a first power transfer means for transferring an output torque of the crankshaft to the interim shaft at all time, and a second power transfer means, which is comprised by a crank pulley mounted for relative rotation on the crankshaft, an interim pulley mounted for relative rotation on the interim shaft, an input pulley related to the auxiliary equipment, and a belt operationally coupling all of the pulleys, for transferring an output torque of the crankshaft to the auxiliary equipment. Between the crankshaft and the crank pulley there is disposed a first electrically operated clutch for connecting and disconnecting a transfer of power between the crankshaft and the crank pulley. Between the interim shaft and the interim pulley there is also disposed a second electrically operated clutch for connecting and disconnecting a transfer of power between the interim shaft and the interim pulley. When the engine operates in a region of low loads and low speeds of rotation, The first clutch disconnects the transfer of power between the crankshaft and the crank pulley and the second clutch connects transfer of power between the interim shaft and the interim pulley so as to create a first transfer path through which the output torque of the crankshaft is transferred to the auxiliary equipment via the interim shaft and the second power transfer means. On the other hand, when the engine operates in a region of high loads and high speeds of rotation, the first clutch connects the transfer of power between the crankshaft and the crank pulley and the second clutch disconnects transfer of power between the interim shaft and the interim pulley so as to create a second transfer path through which the output torque of the crankshaft is transferred to the auxiliary equipment via the crank pulley and the second power transfer means. Specifically, the second transfer path has a power transfer ratio or rotational speed reduction ratio smaller than that of the first transfer path.

The first power transfer means includes a crank sprocket secured to the crankshaft, an interim sprocket secured to the interim shaft, and a chain operationally coupling the crank sprocket and the interim sprocket.

A load absolving means is provided so as to absorb an excessive load applied to the interim means so as to assure a transfer of power to the interim shaft from the first power transfer means.

With this invention, since the transfer ratio of the crankshaft rotation to the auxiliary equipment pulley through the first transfer path differs from that of the secondary transfer path, by selectively switching between the first and secondary power transfer path, the auxiliary equipment can be driven by means of the selected transfer path which is most appropriate to the driving conditions of the engine. Since the first and secondary clutches in the first and secondary power transfer path are disposed between the clutch pulleys and the clutch shaft and between the interim pulley and the interim shaft, respectively, there is no need to place a clutches in close proximity to the auxiliary equipment. Hence the weight of the auxiliary equipment can be held to a minimum. Since the center of gravity of the engine remains unchanged, as is the overall balance of the engine, the occurrence of new oscillations is effectively prevented. Therefore, when the force of thrust acts on the input shaft of the auxiliary equipment attached to the auxiliary pulleys, an increase in the axial oscillation of the input shaft is prevented, and oscillation related noise is reduced.

The first power transfer member which transfers power to the interim shaft from the crankshaft is composed of a fixed sprocket attached to the crankshaft, a fixed sprocket attached to the interim shaft, and a chain operationally coupling these sprockets. This enables the power transfer member to transfer the rotation of the crankshaft more efficiently than with drive belts coupling pulleys.

BRIEF DESCRIPTION OF THE DRAWING

The above and other objects and features of the present invention will be clearly understood from the following description with respect to preferred embodiments thereof when considered in conjunction with the appended drawings, in which.

DETAILED DESCRIPTION OF THE PREFERRED EMBODIMENT

Figure 1:
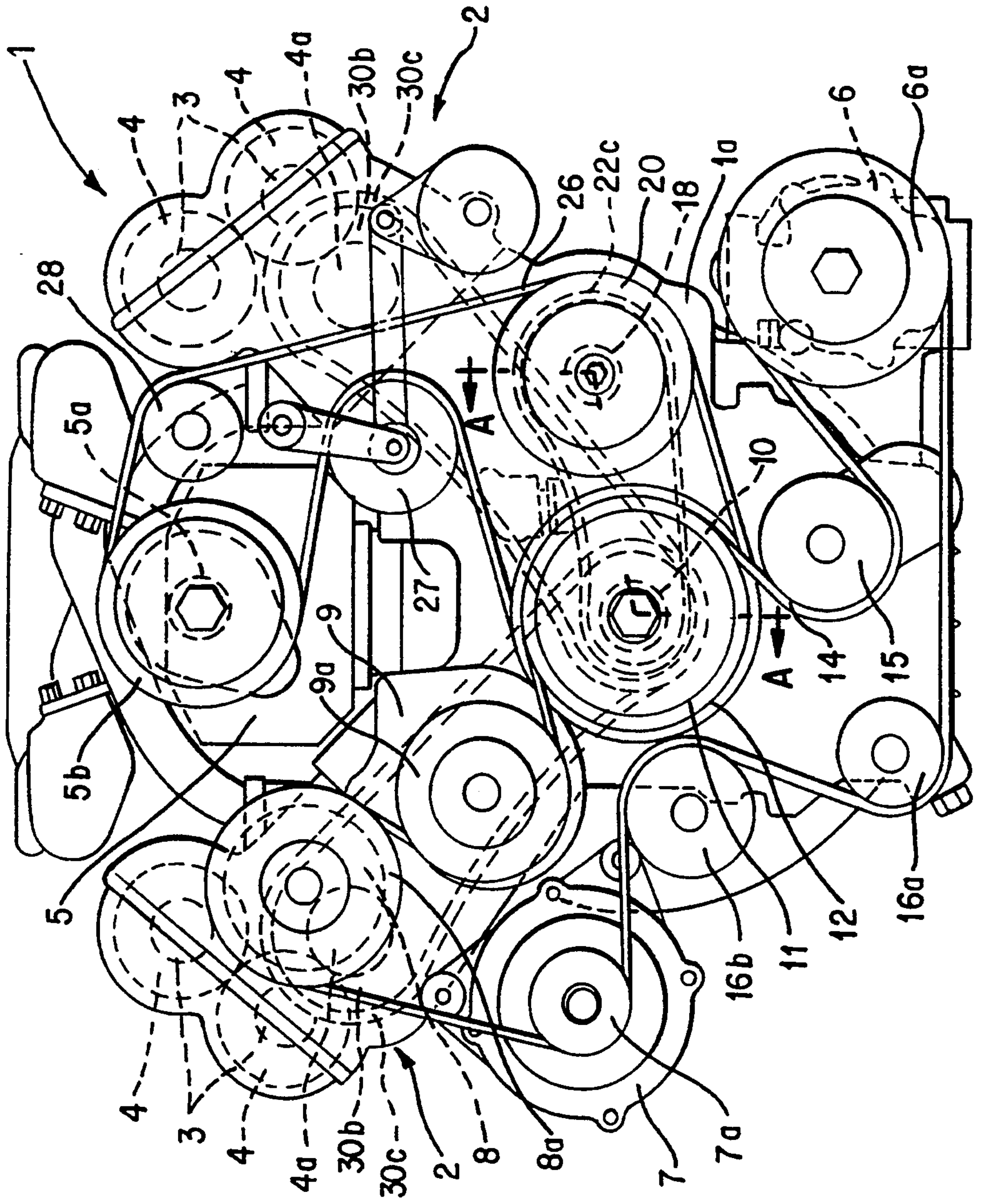
FIG. 1 is a front view of an engine equipped with an auxiliary equipment drive system in accordance with a preferred embodiment of the present invention.
Figure 2:
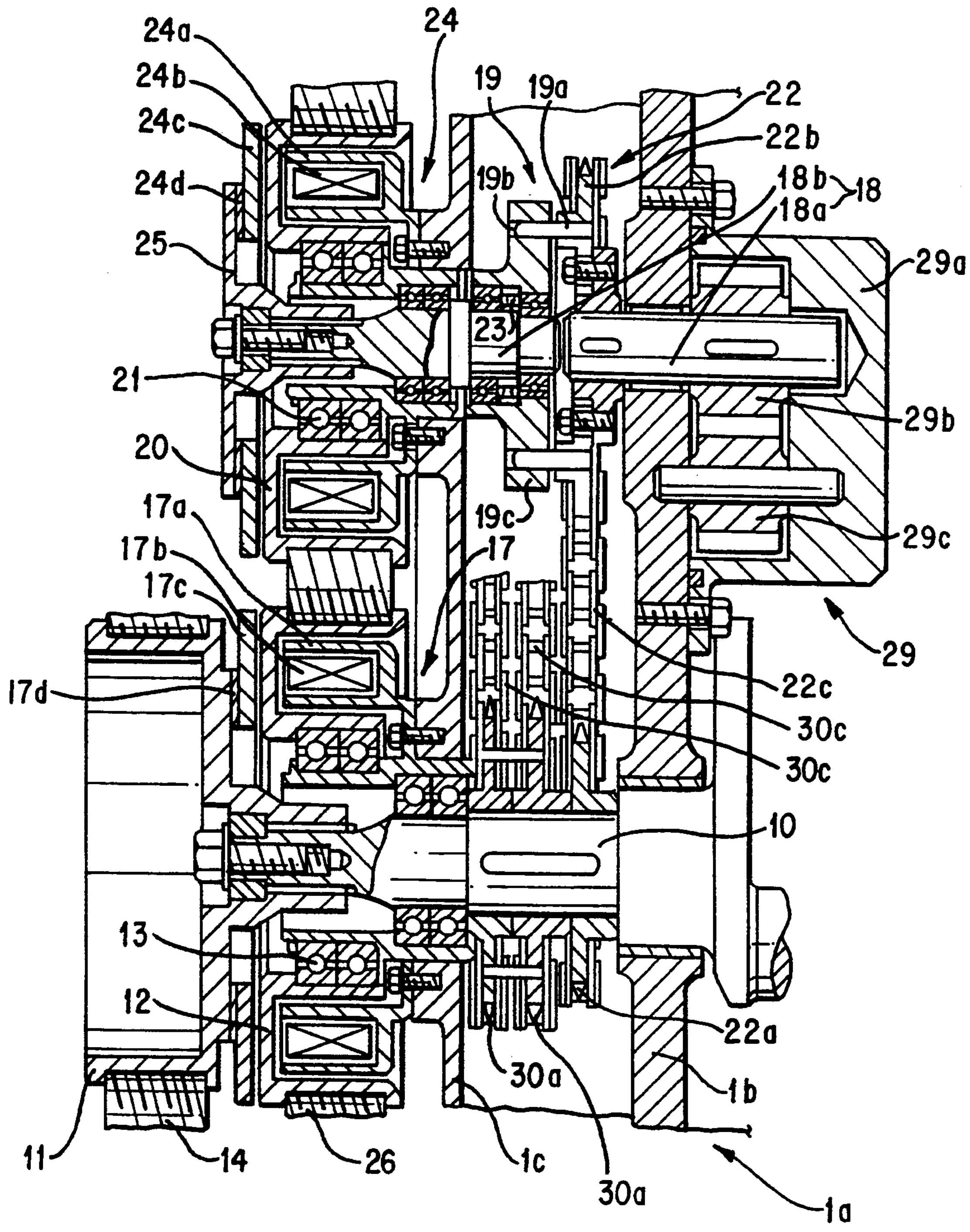
FIG. 2 is an enlarged cross-sectional view of FIG. 1 taken along line A—A.

Referring to the drawings in detail, and, in particular, to FIGS. 1 and 2, an engine, such as a V-type engine 1 having two cylinder banks 2 arranged in a V-formation, which is provided with an auxiliary equipment drive system according to a preferred embodiment of the present invention is shown. Above each of the cylinder banks 2, are displaced intake and exhaust camshafts **3*a* and 3*b* extending in parallel with an engine crankshaft 10. At the ends of camshafts 3*a* and 3*b* are fixedly attached cam gears 4*a* interengaged with each other. A mechanical turbo charger 5 is disposed in a V-shaped space formed between the cylinder banks 2 of V-type engine 1. In close proximity to an engine block 1*a* of V-type engine 1 are displaced an air conditioning compressor 6, an alternator 7, a power steering oil pump 8, and a water pump 9, all of which are engine related auxiliary equipments driven by the crankshaft 10 of V-type engine 1**.

As shown in FIG. 2, at the end of crankshaft 10 which extends externally from the forward wall **1*b* of the engine block 1*a*, a first crankshaft pulley 11, which is utilized to drive such auxiliary equipment as the air conditioning compressor 6 and the alternator 7, is spline coupled. In addition, a secondary crankshaft pulley 12, which is utilized to drive the super charger 5, is mounted for relative rotation on the crankshaft 10 through a bearing 13. A power transmission belt 14 operationally couples a pulleys 6*a*, 7*a*, 8*a* and 9*a* to the first crankshaft pulley 11 so as to drive the air conditioning compressor 6, alternator 7, power steering oil pump 8 and the water pump 9, respectively, by the crankshaft 10. Between the first crankshaft pulley 11 and pulley 6*a* used for driving the air conditioner compressor 6 there is disposed an automatic tensioner 15 which automatically regulates the tension of drive belt 14, and between the pulley 6*a* of the air conditioner compressor 6 and the pulley 7*a* of the alternator 7 there are disposed idle rollers 16*a* and 16*b***.

Between the crankshaft 10 and the secondary crankshaft pulley 12 there is provided a first electromagnetic clutch 17 which engages and disengages the secondary crankshaft pulley 12 and crankshaft 10. The first electromagnetic clutch 17 is comprised of a clutch case **17*a*, a coil 17*b* housed in the clatch case 17*a*, a clutch disk 17*c* and a leaf spring 17*d*. This clutch case 17*a* is secured within a cover 1*c* for covering the forward wall 1*b* of engine block 1*a*. The clutch disk 17*c*, which is located facing to and at a specific distance from the coil 17*b*, rotates together with the first crankshaft pulley 11 spline coupled to the crankshaft 10. The leaf spring 17*d*, which is disposed between the clutch disk 17*c* and first crankshaft pulley 11, so as to ordinarily press and urge the clutch disk 17*c* against the first clutch pulley 11. When the coil 17*b* is excited, the clutch disk 17*c* is pulled toward the secondary crankshaft pulley 12 against the spring force of leaf spring 17*d*, so as to be brought into contact with the secondary crankshaft pulley 12, thereby coupling the secondary crankshaft pulley 12 and crankshaft 10** together and causing them to rotate as one whole.

An interim shaft 18 is arranged in parallel with and in close proximity to the crankshaft 10. This interim shaft 18 is divided into two pieces, i.e. a first interim shaft **18*a* which is supported for rotation by the front wall 1*b* of engine block 1*a*, and a secondary interim shaft 18*b* which is coupled through a coupling means 19 to the first interim shaft 18*a* and whose leading end protrudes forwardly from the cover 1*c*. An interim pulley 20, for driving the supercharger 5, is mounted for relative rotation on the leading end of the secondary interim shaft 18*b* through a bearing 21. In addition, between the first interim shaft 18*a* and crankshaft 10 there is provided a power transfer means 22 which serves to ordinarily transfer power or torque of crankshaft 10 to the first interim shaft 18*a*. This power transfer means 22, which is located between the front wall 1*b* of engine block 1 and the cover 1*c* at the front wall 1*b*, comprises sprockets 22*a* and 22*b*, fixed to the crankshaft 10 and the first interim shaft 18*a*, respectively, and a chain 22*c* operationally coupling both sprockets 22*a* and 22*b*. The diameter of sprocket 22*b* on the first interim shaft 18*a* is greater than that of sprocket 22***a* on the crankshaft 10 so as to transfer a reduced rotation of crankshaft 10 to the first interim shaft 18*a*.

The coupling means 19 has a plurality of engagement pins 19*a* protruding from and press fitted into the sprocket 22*b* secured to the first interim shaft 18*a*, and a rotary member 19*c* formed with a plurality of engagement holes 19*b*, each of which is engaged by the engagement pin 19*a*, and mounted for rotation on the rear end of secondary interim shaft 18*b*. An appropriate clearance is provided between each of the engagement pins 19*a* and the engagement hole 19*b* into which the engagement pin 19*a* is fitted so as to absorb any misalignment of the axes of first and secondary interim shafts 18*a* and 18*b* due to assembling errors of the interim shaft 18. which is rotatably mounted to the rear end of shaft 18*b*, A one way clutch 23 is provided between the secondary interim shaft 18*b* and the rotary member 19*c* rotatably mounted on the rear end of shaft 18*b*. This one-way clutch 23 transfers rotation from the power transfer mean 22 to the secondary interim shaft 18*b* and, when an input speed of rotation to secondary interim shaft 18*b* becomes higher than that to the first interim shaft 18*a*, allows relative rotation between the first and secondary interim shafts 18*a* and 18*b*. Between the secondary interim shaft 18*b* and the interim pulley 20 there is disposed a secondary electromagnetic clutch 24 which engages and disengages the interim pulley 20 and the secondary interim shaft 18*b*. This secondary electromagnetic clutch 2 is comprised of a clutch case 24*a*, a coil 24*b* housed in the clatch case 24*a*, a clutch disk 24*c* and a leaf spring 24*d*. This clutch case 24*a* is secured within a cover 1*c* for covering the forward wall 1*b* of engine block 1*a*. The clutch disk 24*c*, which is located at a specific distance from the coil 24*b* so as to face to the coil 24*b*, rotates together with a rotary member 25 spline coupled to the forward end of secondary interim shaft 18*b*. The leaf spring 24*d*, which is disposed between the clutch disk 24*c* and rotary member 25, ordinarily presses and urge the clutch disk 24*c* against the interim pulley 20. When the coil 24*b* is energized or exited, the clutch disc 24*c* is pulled to the interim pulley 20 against the force of leaf spring 24*d*, so as to bring the interim pulley 20 coupled together with the secondary interim shaft 18*b*, thereby causing them to rotate together as one whole.

A drive belt 26 couples the interim pulley 20 attached to the forward end of secondary interim shaft 18*b* and the pulley 5*b* secured to the input shaft 5*a* of the supercharger 5 to the secondary crankshaft pulley 12 attached to the end of crankshaft 10 so as to drive the supercharger 5 by the crankshaft 10. The diameter of the interim pulley 20 is designed and adapted to be smaller than those of supercharger pulley 5*b* and of secondary crankshaft pulley 12. Between the secondary crankshaft pulley 12 and supercharger pulley 5*b* there is disposed an auto-tensioner 27 for automatically adjusting the tension of drive belt 26, and an idle roller 28.

A casing 29*a* of the gear type oil pump 29 is secured to the internal surface of the forward wall 1*b* of engine block 1. One of a set of drive gears 29*b* and 29*c* in intermesh with each other within the casing 29*a* is connected to the first interim shaft 18*a* so as to drive the oil pump 29 by the first interim shaft 18*a*. Furthermore, a set of sprockets 30*a* are fixedly mounted on the crankshaft 10 between the front wall 1*b* of engine block 1 and the cover 1*c*. As shown in FIG. 1, these sprockets 30*b*,30*b* are connected to a set of drive gears 4*a*, respectively, enmeshed with either one of cam gears 4, which are disposed above each of the cylinder banks 2. The sprocket 30*b* is operationally coupled to the sprocket 30*a* of crankshaft 10 by a drive chain 30*c* so as to drive the camshafts 3 in synchronism in rotation with the crankshaft 10.

Figure 3:
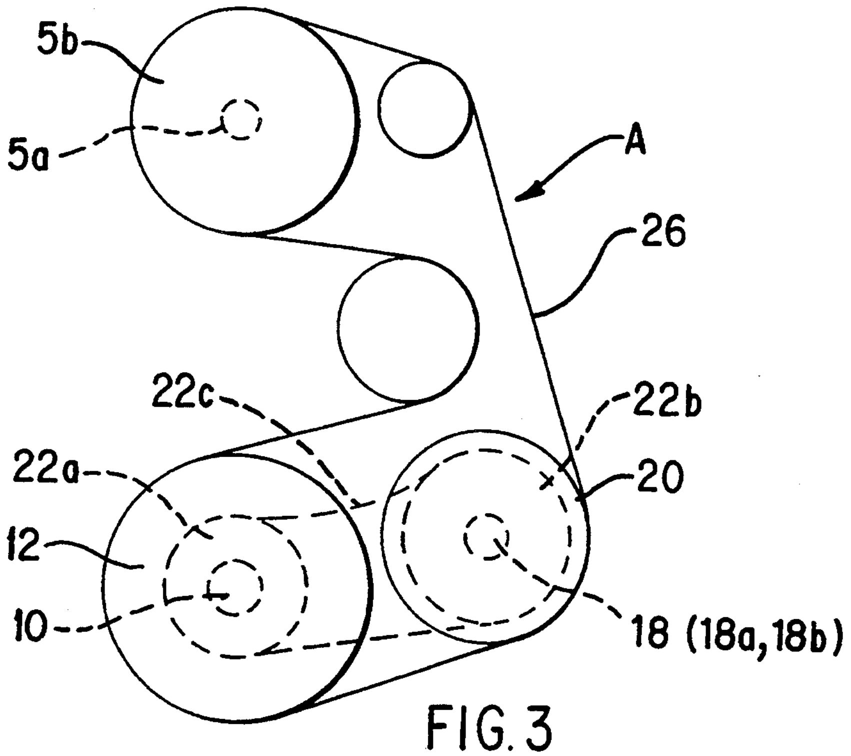
FIG. 3 is a schematic illustration of a first transfer path.
Figure 4:
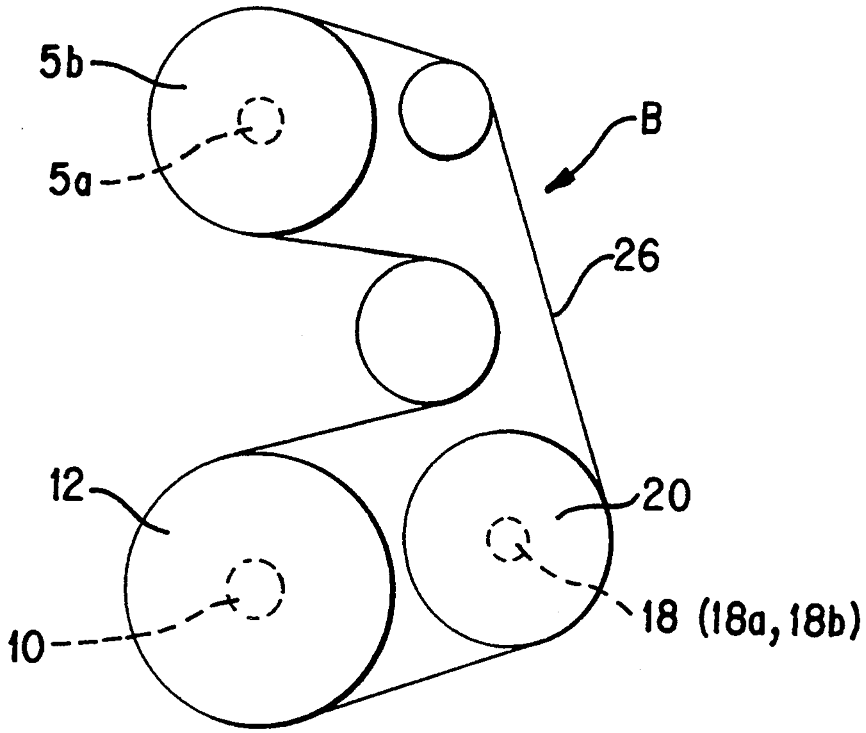
FIG. 4 is a schematic illustration of a second transfer path.

Referring to FIGS. 3 and 4, drive power is selectively transferred through first and secondary transfer paths A and path B. The first transfer path A is organized by causing the first electromagnetic clutch 17 to operationally disconnect the secondary crankshaft pulley 12 from the crankshaft 10 and the secondary electromagnetic clutch 24 to operationally connect the interim pulley 20 to the secondary interim shaft 18*b*. In the first transfer path A, the rotational torque of crankshaft 10 is transferred to the first interim shaft 18*a* by means of power transfer member 22, and then to the supercharger pulley 5*b* secured to the input shaft 5*a* of supercharger 5 by means of the interim pulley 20 and drive belt 26. On the other hand, the secondary transfer path B is organized in a reverse manner, i.e., by causing the secondary electromagnetic clutch 24 to disconnect the interim pulley 20 from the secondary interim shaft 18*b* and the first electromagnetic clutch 17 to connect the secondary crankshaft pulley 12 to the crankshaft 10. In the secondary transfer path B, the rotational torque of crankshaft 10 is transferred to the supercharger pulley 5*b* secured to the input shaft 5*a* of supercharger 5 by means of the secondary crankshaft pulley 12 and drive belt 26. These transfer paths A and B are selectively organized according to engine operating conditions.

Figure 5:
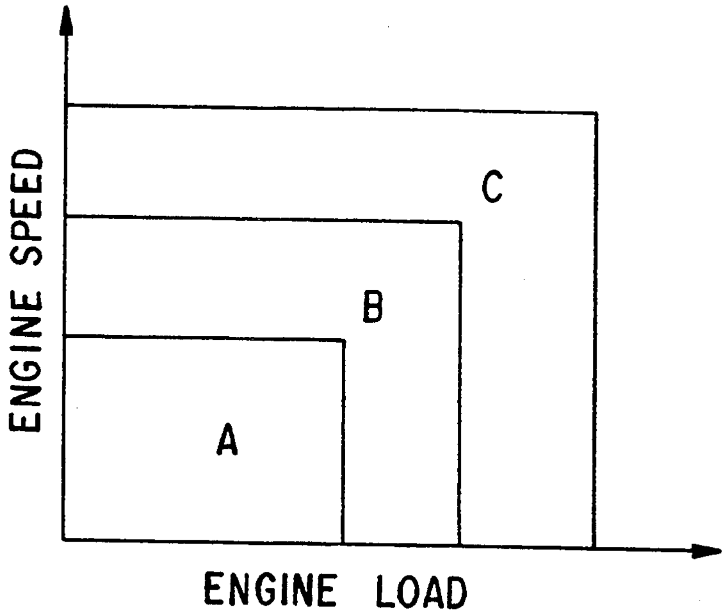
FIG. 5 is a map showing regions of engine operating conditions.

As shown in FIG. 5, in a low region A where the engine 1 is operated at low loads and low speeds of rotation less than a specified low engine load and a specified low speed of rotation, both first and secondary electromagnetic clutches 17 and 24 are de-energized or turned off so as to leave the supercharger 5 inoperable. In a medium region B where the engine 1 operates at medium loads and speed of rotation, only the secondary electromagnetic clutch 24 is energized or turned on, while the first electromagnetic clutch 17 is left de-energized, as a result, the first transfer path A shown in FIG. 3 is effectively organized so as to reduce and transfer the rotational torque of crankshaft 10 to the input shaft 5*a* of supercharger 5, thereby driving the supercharger 5. Further, in a high region C where the engine 1 operates at high loads and high speeds of rotation, only the first electromagnetic clutch 17 is energized or turned on, while the secondary electromagnetic clutch 24 is left deenergized, as a result, the secondary transfer path B shown in FIG. 4 is effectively organized so as to transfer the rotational torque of crankshaft 10 to the input shaft 5*a* of supercharger 5 without reducing it, thereby driving the supercharger 5.

With this configuration of the auxiliary equipment drive system of the present invention, since the ratio of rotation between the crankshaft 10 and the supercharger pulley 5*b* of the supercharger 5 differs between the first transfer path A and the secondary transfer path B, then by selectively switching between the first and secondary power transfer paths A and B, the supercharger 5 can be appropriately operated at a ratio of rotation depending upon the transfer path which is selected to best suit the driving condition of engine.

Because the first and secondary electromagnetic clutches 17 and 24, forming parts of the first and secondary transfer paths A and B, respectively, are disposed between the secondary crankshaft pulley 12 and crankshaft 10 and between the interim pulley 20 and secondary interim shaft 18*b*, respectively, it is not necessary to dispose a particular clutch, which is generally a body of relatively large mass, in any position relative to the supercharger 5, so as to keep down the weight of supercharger 5. By this means, even if a thrust force is exerted on the input shaft 5*a* of supercharger 5 accompanying the rotation of input shaft 5*a* to which supercharger pulleys 5*b* is secured, excessive axial vibrations of input shaft 5*a* are prevented, and noise due to the axial vibrations is measurably reduced.

No clutch is provided relative to the supercharger 5, so as to prevent the supercharger 5 from being increased in weight, thereby not disturbing the overall weight balance of V-type engine 1 and the center of gravity of V-type engine 1. This also results in effectively prevention of the occurrence of vibrations prevented.

In addition, since the power transfer member 22 which transfers the rotational torque of crankshaft 10 to the first interim shaft 18*a* is comprised of the sprockets 22*a* and 22*b* secured to the crankshaft 10 and the first interim shaft 18*a*, which are operationally coupled by the chain 22*c*, it is more efficient in transferring the rotational torque of crankshaft 10 than the configuration that pulleys fixed, respectively, to the crankshaft 10 and the first interim shaft 18*a* are operationally coupled by a belt. Furthermore, since the oil pump 29 is driven by means of the first interim shaft 18*a* forming a part of the interim shaft 18 which drives the supercharger 5, the interim shaft 18 is utilized to drive both supercharger 5 and oil pump 29, thereby simplifying the entire configuration of the auxiliary equipment drive system.

The one-way clutch 23 allows slippage or relative rotation between the first and secondary interim shafts 18*a* and 18*b* when an input rotational speed to the secondary interim shaft 18*b* becomes higher exceeding that to the first interim shaft 18*a*. Accordingly, even if the first and secondary interim shafts 18*a* and 18*b* are simultaneously subjected to different rotational speeds from the crankshaft 10 due to what is called a "double rock" under the simultaneous energization of first and secondary electromagnetic clutches 17 and 24 which results from abnormalities of both or either one of first and secondary electromagnetic clutches 17 and 24, the slippage or relative rotation secures the power transfer to the first interim shaft 18*a* by means of the power transfer member 22. As a result, the proper operation of the oil pump 29 is assured even if there is a malfunction of the first and secondary electromagnetic clutches 17 and 24.

Sprockets 30*a* and 30*b* operationally coupled by means of chain 30*c* for driving the camshafts 3 and the power transfer member 22, by which the rotational torque of crankshaft 10 is transferred to the first interim shaft 18*a*, are concealed within the cover 1*c* attached to the front wall 1*a* of engine block 1*a*. In addition, the oil pump 29 driven by means of the first interim shaft 18*a* is arranged within the engine block 1*a*. This configuration effectively prevents communication of operating sounds of the power transfer member 22 and oil pump 29 to the outside, and protects the power transfer member 22 and oil pump 29 as well.

The rotational speed of crankshaft 10 is reduced and transferred to the supercharger 5 through the first transfer path A when the V-type engine 1 is operating in the middle load, middle speed operating region (B), and, however, is transferred to the supercharger 5 through the secondary power transfer path B without being reduced when being operating in the high load, high speed region (C). Accordingly, if abnormalities occur in and disables the secondary electromagnetic clutch 24, which provides the connection between the secondary interim shaft 18*b* and interim pulley 20, while the engine is operating in the low load, low speed region, a large increase in engine speed induces the connection between the crankshaft 10 and secondary crankshaft pulley 12 by means of first electromagnetic clutch 17, so as to cause the precipitous operation of supercharger 5. Consequently, there occurs a large change in engine torque, producing a torque shock. Because of the resultant torque shock, the existence of any malfunctioning of the secondary electromagnetic clutch 17 is certainly recognized by the driver.

Figure 6:
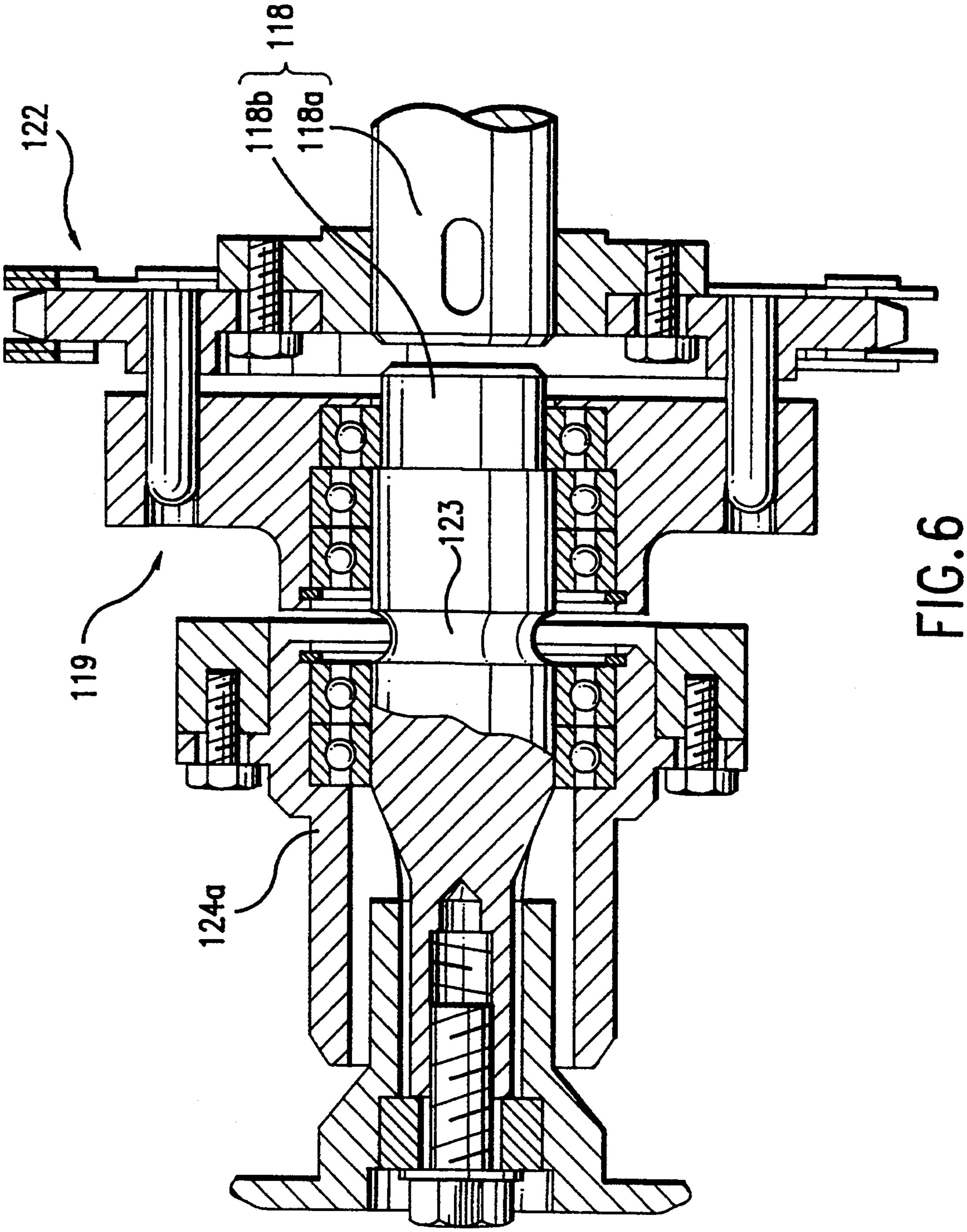
FIG. 6 is an enlarged cross-sectional view of a fail-safe means.
Figure 7:
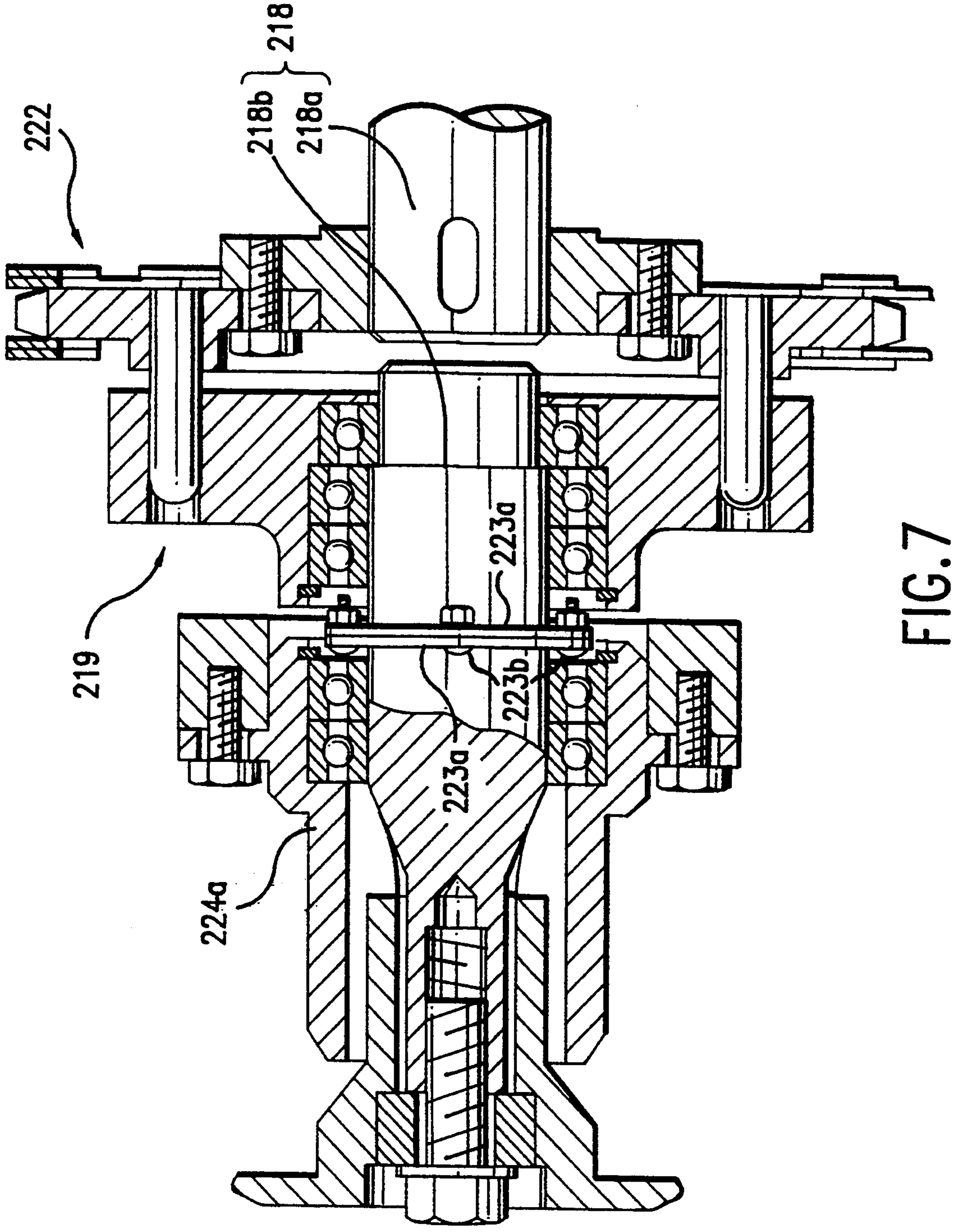
FIG. 7 is an enlarged cross-sectional view of another fail-safe means.

In the above-described configuration of the auxiliary equipment drive system, the one way clutch 23 may be replaced with a fail-safe means, as shown in FIGS. 6 and 7, for certainly performing the transfer of drive torque at least to the first interim shaft 18*a* by means of the power transfer member 22 when great differing loads are exerted simultaneously onto both first and secondary interim shafts 18*a* and 18*b* forming the interim shaft 18.

Referring to FIG. 6 showing a fail-safe means 100, an interim shaft 118 is divided into two shaft pieces, i.e. a first interim shaft 118*a*, to which the rotational torque of the crankshaft (not shown) is transferred through a power transfer means 122, and a secondary interim shaft 118*b* which is connected to the first interim shaft 118*a* through a coupling means 119. The first interim shaft 118*a* is formed with an annular groove 123 in its rear portion between a clutch case 124*a* and the coupling means 119.

With this fail-safe means 100, if, for instance, different magnitudes of loads are applied simultaneously to the first and secondary interim shafts 118*a* and 118*b* with abnormal rotation of a supercharger (not shown) which is driven by a drive torque transferred from the crankshaft or the secondary interim shaft 118, or with an operational malfunction of electromagnetic clutches provided on the crankshaft and secondary interim shaft 118*b*, respectively, the secondary interim shaft 118*b* is broken at its annular groove 123. As a result, the drive torque is certainly transferred at least to the first interim shaft 118*a* from the power transfer means 122, so as to assure the operation of an oil pump (not shown) by means of the secondary interim shaft 118*a*.

Referring to FIG. 7 showing another fail-safe means 200, an interim shaft 218 is divided into a first interim shaft 218*a*, to which the rotational torque is transferred from a crankshaft (not shown) through a power transfer means 222, and a secondary interim shaft 218*b*, which is coupled to the first interim shaft 218*a* through a coupling means 219. The secondary interim shaft 218*b* is divided into two parts at a position between a clutch case 224*a* and the coupling means 219, these parts being interconnected by means of their end flanges 223*a* and 223*a* which are fastened and held together with a plurality of set bolts 223*b* made of for instance aluminum and the like.

With this fail-safe means 200, if, for instance, different magnitudes of loads are applied simultaneously to the first and secondary interim shafts 218*a* and 218*b* with abnormal rotation of a supercharger (not shown) which is driven by a drive torque transferred from the crankshaft or the secondary interim shaft 218, or with an operational malfunction of electromagnetic clutches provided on the crankshaft and secondary interim shaft 218*b*, respectively, the flanges 223*a* are broken to separate the interim shaft 218 into two parts. As a result, the drive torque is certainly transferred at least to the first interim shaft 218*a* from the power transfer means 222, so as to assure the operation of an oil pump (not shown) by means of the secondary interim shaft 218*a*.

It is to be understood that, in the configuration of the auxiliary equipment drive system, a fail-safe means such as shown in FIG. 6 or 7 may be applied to the engagement pins 19*a* of the coupling means 19, in addition to the one-way clutch 23. Furthermore, the rotational torque of crankshaft 10 may be reduced and transferred to supercharger 5 not by the first transfer path A but by the secondary transfer path B. This is realized by providing the interim pulley 20 attached to the secondary interim shaft 18*b* made greater in diameter than the secondary crankshaft pulley 12. In this instance, the supercharger 5 is driven through the secondary transfer path B when the engine is operating in the low load, low speed region, and, on the other hand, by the first transfer path A when the engine is operating in the high load, high speed region. In addition, an auxiliary equipment to be differently driven through the first and secondary transfer paths A and B is not limited to the mechanical supercharger 5. Further, as an auxiliary equipment to be is driven by means of first interim shaft 18, 118 or 218 is not limited to only the oil pumps, but other auxiliary equipments such as a water pumps can also be so driven.

Although the above description has been provided with respect to an appropriate application of an auxiliary equipment drive system cooperating with a V-type engine, nevertheless, the auxiliary equipment drive system of this invention is not limited in its application to V-type engines.

It is also to be understood that although the present invention has been described with respect to specific preferred embodiments thereof, various other embodiments and variants, which fall within the scope and spirit of the invention, may occur to those skilled in the art. Such other embodiments and variants are intended to be covered by the following claims.

What is claimed is

1. A drive system for driving an auxiliary equipment of an automobile engine by an engine crankshaft through a torque transfer mechanism having an interim shaft, said drive system comprising:

first power transfer means for transferring an output torque of said crankshaft to said interim shaft at all time;

second power transfer means, which is comprised by a crank pulley mounted for relative rotation on said crankshaft, an interim pulley mounted for relative rotation on said interim shaft, an input pulley related to said auxiliary equipment, and a belt operationally coupling all of said pulleys, for transferring an output torque of said crankshaft to said auxiliary equipment;

first electrically operated clutch means, disposed between said crankshaft and said crank pulley, for connecting and disconnecting a transfer of power between said crankshaft and said crank pulley;

second electrically operated clutch means, disposed between said interim shaft and said interim pulley, for connecting and disconnecting a transfer of power between said interim shaft and said interim pulley; and transfer path changing means for causing said first clutch means to disconnect said transfer of power between said crankshaft and said crank pulley and said second clutch means to connect transfer of power between said interim shaft and said interim pulley so as to create a first transfer path through which said output torque of said crankshaft is transferred to said auxiliary equipment via said interim shaft and said second power transfer means when said engine operates in a region of low loads and low speeds of rotation, and causing said first clutch means to connect said transfer of power between said crankshaft and said crank pulley and said second clutch means to disconnect transfer of power between said interim shaft and said interim pulley so as to create a second transfer path, which has a power transfer ratio different from that of said first transfer path through which said output torque of said crankshaft is transferred to said auxiliary equipment via said crank pulley and said second power transfer means when said engine operates in a region of high loads and high speeds of rotation.

2. A drive system as defined in claim 1, wherein said second transfer path has a power transfer ratio smaller than that of said first transfer path.

3. A drive system as defined in claim 1, wherein a power transfer ratio of said first transfer path is determined based on a ratio of rotation between said crankshaft and said interim shaft.

4. A drive system as defined in claim 1, wherein a power transfer ratio of said first transfer path is determined based on a ratio of rotation between said interim pulley and said input pulley related to said auxiliary equipment.

5. A drive system as defined in claim 1, wherein a power transfer ratio of said second transfer path is determined based on a ratio of rotation between crank pulley and said input pulley related to said auxiliary equipment.

6. A drive system as defined in claim 1, wherein said first power transfer means includes a crank sprocket secured to said crankshaft, an interim sprocket secured to said interim shaft, and a chain operationally coupling said crank sprocket and said interim sprocket.

7. A drive system as defined in claim 1, wherein said interim shaft is linked to a pump so as to drive said pump at all time.

8. A drive system as defined in claim 7, further comprising load absolving means for absorbing an excessive load applied to said interim means so as to assure a transfer of power to said interim shaft from said first power transfer means.

9. A drive system as defined in claim 7, wherein said first power transfer means and said pump are placed within said engine.

10. A drive system for driving an auxiliary equipment of an automobile engine by an engine crankshaft through a torque transfer mechanism having an interim shaft, said drive system comprising:

first power transfer means for transferring a rotational speed of said crankshaft to said interim shaft at all time;

second power transfer means, which is comprised by a crank pulley mounted for relative rotation on said crankshaft, an interim pulley mounted for relative rotation on said interim shaft, an input pulley related to said auxiliary equipment, and a belt operationally coupling all of said pulleys, for transferring a rotational speed of said crankshaft to said auxiliary equipment;

first electrically operated clutch means, disposed between said crankshaft and said crank pulley, for connecting and disconnecting a transfer of power between said crankshaft and said crank pulley;

second electrically operated clutch means, disposed between said interim shaft and said interim pulley, for connecting and disconnecting a transfer of power between said interim shaft and said interim pulley; and transfer path changing means for causing said first clutch means to disconnect said transfer of power between said crankshaft and said crank pulley and said second clutch means to connect transfer of power between said interim shaft and said interim pulley so as to create a first transfer path through which said rotational speed of said crankshaft is reduced and transferred to said auxiliary equipment via said interim shaft and said second power transfer means when said engine operates in a region of low loads and low speeds of rotation, and causing said first clutch means to connect said transfer of power between said crankshaft and said crank pulley and said second clutch means to disconnect transfer of power between said interim shaft and said interim pulley so as to create a second transfer path, which has a rotational speed transfer ratio smaller than that of said first transfer path through which said rotational speed of said crankshaft is transferred to said auxiliary equipment via said crank pulley and said second power transfer means when said engine operates in a region of high loads and high speeds of rotation.

* * * * *